A. GOODYEAR, 2nd.

Improvement in Harvester-Droppers.

No. 133,025.  Patented Nov. 12, 1872.

UNITED STATES PATENT OFFICE.

ALBERT GOODYEAR, 2D, OF HAMDEN, CONNECTICUT.

IMPROVEMENT IN HARVESTER-DROPPERS.

Specification forming part of Letters Patent No. 133,025, dated November 12, 1872.

*To all whom it may concern:*

Be it known that I, ALBERT GOODYEAR, 2d, of Hamden, in the county of New Haven and State of Connecticut, have invented an Improvement in Gatherers for Harvesters, of which the following is a specification:

Harvesters have been made with an apron or platform operated by the attendant to drop the grain periodically, and the grain has been conveyed to a bundler by a gatherer moving laterally, and the grain has also been conveyed by an endless belt to the place where the bundle is removed by hand.

My invention consists in a revolving dropper actuated by a belt that periodically removes a holding-latch and gives such dropper a half rotation. This is combined with an endless apron behind the cutter-bar that conveys the grain laterally to the dropper.

Figure 2:
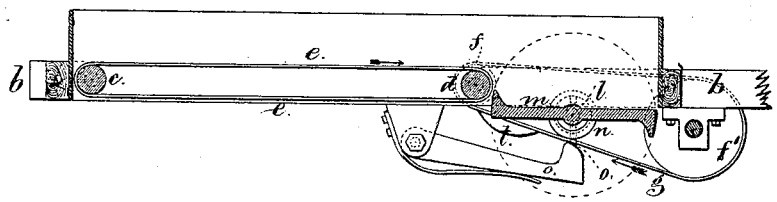
Figure 1:
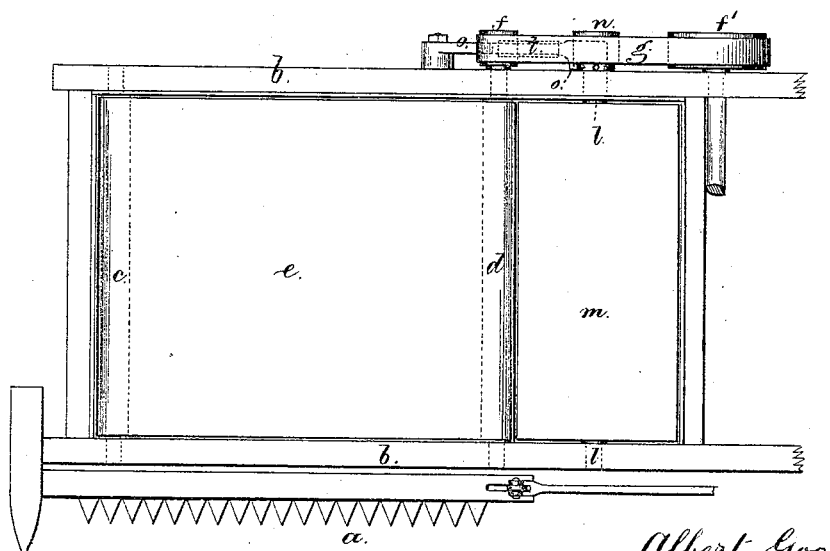

In the drawing, Figure 1 is a plan representing my apparatus and the position of the same relatively to the cutter bar; and Fig. 2 is a longitudinal section of the same.

The cutter-bar, finger-board, and cutters are of any usual character. They are represented at $a$. The other parts of the reaping-machine may be of any desired construction; and the connection of my improvements with such machine will be varied according to circumstances. The frame $b$ receives the two rollers $c\ d$, around which is the endless belt $e$, made of suitable material, but, preferably, with slats. This belt receives a movement from the pulley $f$, belt $g$, and wheel $f'$, the latter being driven by a connection to the driving-wheel of the reaping-machine. The belt $g$ is either continuously operative or rendered so by a tightener and lever controlled by the driver. The belt $e$ receives upon its surface the grain as it is cut, and carries the same off laterally and deposits it upon a dropper that is worked periodically to deliver the bundle of grain ready for binding. The shaft $l$ carries the dropper $m$ and extends to the pulley $n$. A latch, $o$, is provided to hold the shaft and prevent its turning; and the belt $g$ runs between the latch $o$ and the pulley $n$, and upon the belt is a cam-plate, $t$, that simultaneously presses back the latch $o$, and causes the pulley $n$ and dropping mechanism to be revolved to deliver the bundle of grain that has accumulated, and the dropper continues its movement until arrested by the latch $o$, and then it is in position for the grain to fall upon it in making up the next bundle.

I claim as my invention—

The revolving dropper actuated by the belt $g$ and cam $t$, substantially as specified, in combination with the latch $o$, apron or belt $e$, and cutter-bar, as set forth.

Signed by me, this 18th day of September, A. D. 1872.

ALBERT GOODYEAR, 2D.

Witnesses:
ALFRED GOODYEAR,
WATSON CARTWRIGHT.